United States Patent

Barnes et al.

[15] 3,683,373
[45] Aug. 8, 1972

[54] SOLID STATE DISPLAY OF RANGE AND AZIMUTH INFORMATION

[72] Inventors: James A. Barnes; John E. Bjornholt, both of Scottsdale, Ariz.

[73] Assignee: Motorola, Inc., Franklin Park, Ill.

[22] Filed: Jan. 21, 1970

[21] Appl. No.: 4,618

[52] U.S. Cl. ............................... 343/5 DP, 343/11 R
[51] Int. Cl. ............................ G01s 9/02, G01s 7/04
[58] Field of Search .................... 343/5 DP, 5 EM, 11

[56] References Cited

UNITED STATES PATENTS

| | | | |
|---|---|---|---|
| 3,403,396 | 9/1968 | Van Popta et al. | 343/5 DP |
| 3,315,258 | 4/1967 | Dillard | 343/5 DP |
| 3,386,091 | 5/1968 | Wilmot et al. | 343/5 DP |
| 3,096,516 | 7/1963 | Pendleton et al. | 343/11 |
| 3,178,708 | 4/1965 | Kuck | 343/7.7 |
| 3,134,974 | 5/1964 | Orenstein | 343/11 |

*Primary Examiner*—Malcolm F. Hubler
*Attorney*—Mueller, Aichele & Rauner

[57] ABSTRACT

A field is scanned in azimuth at a low rate by range and azimuth radar equipment which may be mounted on a vehicle and the gathered range and azimuth information is stored in a memory matrix at a slow rate. The information is destructively read out of the memory matrix and applied to a display comprising light emitting cells arranged in a truncated sector of a circle at a much higher rate, the information being fed back into the matrix memory to restore the information thereto. When the vehicle turns, the stored information is shifted in the memory matrix to make the displaced or shifted information indicate the true direction with respect to the new orientation of the vehicle. The readout period of time allotted to the range at which there is no target may be reduced if desired to increase display brightness.

11 Claims, 1 Drawing Figure

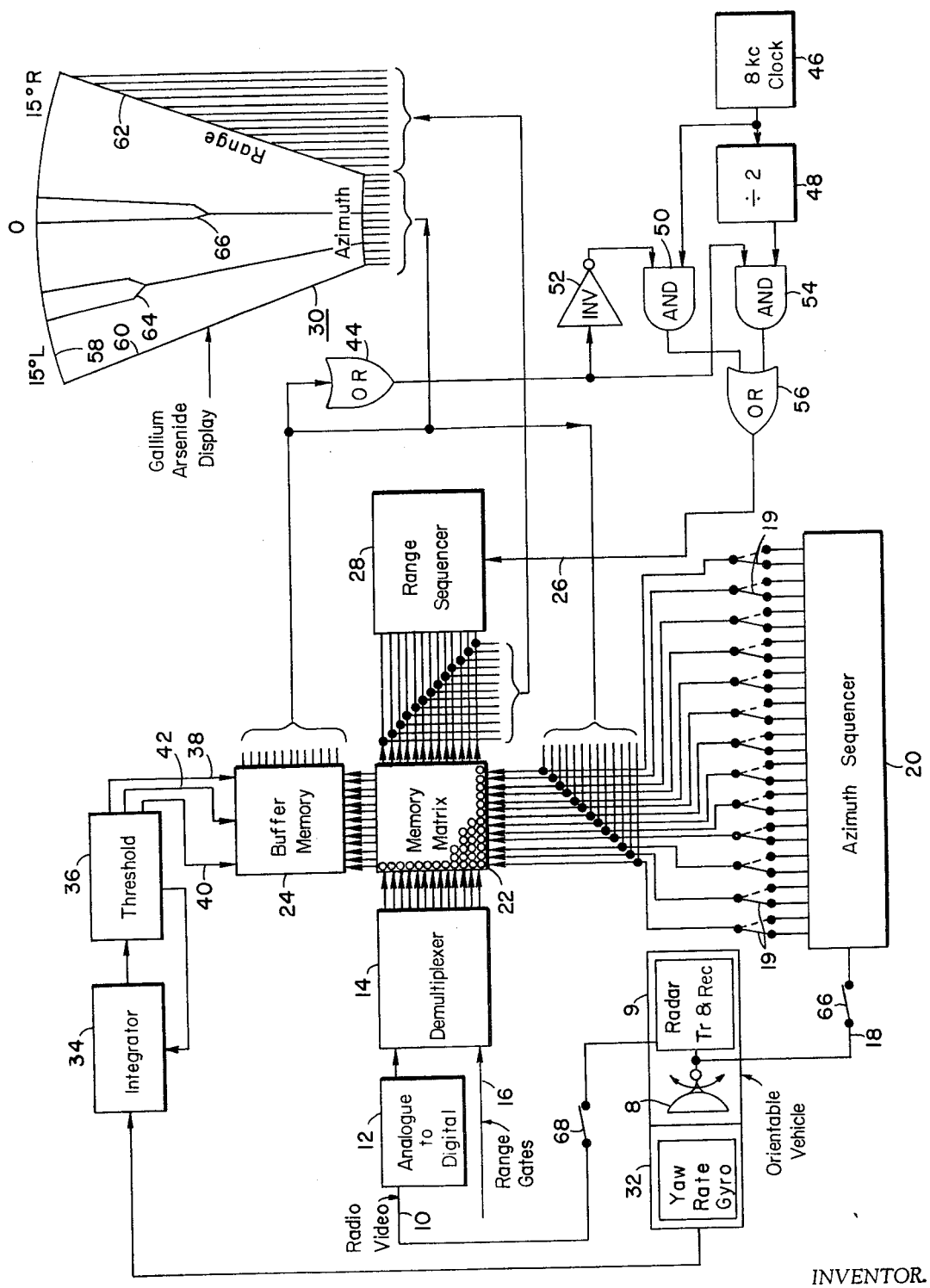

SOLID STATE DISPLAY OF RANGE AND AZIMUTH INFORMATION

BACKGROUND

When a range and azimuth radar are mounted on a vehicle and the terrain ahead of the vehicle is scanned in azimuth at a slow rate, the display of targets may not be true since between scans, the vehicle may change its direction, such as to head toward the target, for example. Then, when the same area is scanned again, the target indication will jump to its new direction from the vehicle, whereby the operator may not know if the new indication is of the same target or of another target. Due to slow antenna scan rates, in many prior art radar devices with direction indication of targets, a display may fade. Furthermore, many prior art radar displays comprise the face of a cathode ray tube, whereby the display apparatus is bulky and is fragile and requires high voltages and is not suitable for use in high vibrational environments. Also, many prior art radar devices cannot provide a record of the field and the target thereon at a desired instant nor can they plot the motion of the vehicle carrying the radar equipment and the target with respect to each other.

It is an object of this invention to provide an improved radar apparatus which indicates relative position of a target and the vehicle carrying the apparatus.

It is a further object of this invention to provide an improved radar apparatus having a solid state display, in which the terrain is scanned in direction at a slow rate and in which the display is continuously updated at a rate independent of the terrain scan, in accordance with the heading of the vehicle carrying the apparatus.

SUMMARY

In accordance with the invention, a radar direction and range indicator is provided comprising a plurality of light producing diodes which are arranged in a display pattern. An antenna comprising a part of radar equipment scans the area ahead of the vehicle carrying the equipment at a slow rate of speed and the range and azimuth information is stored in a memory matrix in which memory elements are arranged in rows and columns. Each column of memory elements corresponds to a predetermined direction from the vehicle or azimuth and each row of memory elements corresponds to a predetermined distance from the vehicle or to range. The memory is read out at a much higher rate of speed, one row at a time, and applied to a buffer memory, the act of reading out the memory clearing the row. The output of the buffer is applied to the matrix to restore the memory that had been stored therein. The output of the buffer is also applied to the several columns of diodes comprising the display. At the same high rate of speed that the rows of memory elements in the matrix are scanned, voltage is applied to the corresponding rows of diodes in the display. A diode situated where the column and the row to which signals are applied crosses will light, indicating the target is present at the azimuth angle and distance indicated by the position of the lighted diode. The high rate of speed that the display is scanned prevents it from appearing to flicker as seen by the observer. The scanning of the memory is much faster than the scanning of the field by the radar antenna whereby if the vehicle changes its heading between successive scannings of the field, the next time the target is scanned by the antenna, the lighted diode would jump in azimuth. A turn rate signal is provided to shift the stored azimuth information in the buffer memory and therefore in the memory matrix while the vehicle is turning, whereby the display will always indicate the correct azimuth of the target from a reference line in the vehicle. Means may be provided to scan the memory even more quickly over ranges where there are no targets, increasing the brightness of the ranges where there are targets. If desired, no information put into the memory matrix is erased, whereby the display will show the path of the vehicle towards the target. Also, if desired, no information is either added or subtracted from the matrix memory, whereby the fixed or frozen display may be studied at leisure.

DESCRIPTION

The invention will be better understood upon reading the following description in connection with the accompanying drawing in which the sole FIGURE is a block diagram of the azimuth and range information display apparatus of this invention.

A direction antenna 8 is mounted on an aircraft or orientable vehicle 9. The antenna 8 slowly scans in azimuth a sector ahead of the vehicle 9 on which the antenna 8 is mounted. A complete scan by the antenna 8 may take several seconds. Pulses of radio waves are radiated by the antenna 8 and the returned reflections are received by this antenna 8. After proper processing, the received wave which includes all received waves for the radar ranges of interest, and is called the radar video information, appears on the line 10 in serial form. This wave is applied to an analog to digital converter 12, which digitizes the information applied thereto. That is, the signal appearing at the output of the analog to digital converter 12 has a value of one whenever the received wave is above a predetermined threshold and a value of zero at all other times. Or, if desired, the output of the analog to digital converter 12 may be digitized at various levels in accordance with the amplitude of the analog inputs. The digitized information from the analog to digital converter 12 is applied to a demultiplexer 14, while a series of range gates is applied to the demultiplexer 14 over the line 16. The result is that an output of the value of one will appear at those of the several output connections of the demultiplexer 14 that corresponds to a predetermined distance from the radar equipment at which a target exists. A zero voltage will be applied to the other outputs of the demultiplexer 14. The ones or zeros are applied to the several output lines of the demultiplexer at a rate determined by the frequency of the transmitted pulses. Since such pulses are transmitted at a high rate of speed, whereby the outputs of the demultiplexer appear at the same rate of speed, the pulse ones are applied substantially continuously on those lines which indicate a target at a particular range.

Also, as the antenna 8 rotates in its scan, a series of pulses appear on the line 18. These pulses which appear on the line 18 are applied to an azimuthal sequencer 20, which has a plurality of pairs of outputs. When the first pulse appears on the line 18, indicating the antenna 8 is at the extreme left, only the most left output, with the shown position of the switch 19, for example, of the azimuthal sequencer 20, applies a current to a column of the memory elements in the memory matrix 22. When the second pulse comes in on the line 18, only the third output from the left of the azimuthal sequencer 20 applies a current to the second column of memory elements in the memory matrix 22 and this process is repeated until all the columns of the memory elements in the memory matrix 22 have had a current applied thereto at successive angular positions of the radar antenna 8. The memory element at the crossing of the range rows and azimuth columns will have two pulses applied thereto only if a target is present at the range and azimuth corresponding to a particular memory element. Therefore, the memory matrix 22 will have stored thereon, upon the completion of one scan in azimuth, information as to all targets in the terrain scanned within the capabilities of the equipment as determined by the azimuth pulses and the range gate pulses. The outputs of the azimuthal sequencer 20 are such as to erase the information on the whole column of memory elements in the memory matrix and then to put new information in that column of memory elements when the switches 19 are in the position shown in full lines, or merely to add new information to a respective column without erasing any information when the switches 19 are all in their other position as illustrated in dotted lines. The next time the same column of memory elements is scanned, the azimuthal pulses first clear the column of memory elements, assuming the switches 19 are in their solid positions, and then prepares the elements in the column to store a one if applied thereto by the range demultiplexer 14. Since the scanning in range is much faster than the scanning in azimuth, certain memory elements in an azimuth column will have impressed thereon a one, if there be a target at a certain range and at a particular azimuth. Then, when the antenna has turned a predetermined angle, the next column of memory elements corresponding to the next azimuthal direction will first be cleared and then will have range information impressed thereon.

The azimuthal output of one row of the memory matrix 22 is applied to a buffer memory 24. Clock pulses are applied to the input connection 26 of a range sequencer 28 by apparatus to be explained. The clock pulses are applied at a high pulse rate, very high compared to the rate of azimuths scanned by the antenna 8 and essentially need not be synchronized therewith. Each pulse applied to the range sequencer 28 causes an output to be applied by the memory matrix 22 to the buffer memory 24, a row of memory elements which correspond to all directions which have a target at a predetermined range and to erase the memory in that particular row of memory elements which had been previously stored therein. The information stored in the buffer memory 24 is applied to all the columns of a display device 30 and also to all the columns of the memory matrix 22 during the existence of the pulse applied to the range sequencer on the line 26. This feed around to the azimuth input of the memory matrix 22 causes restoration of the memory erased by readout thereof. At the same time that the output of the buffer memory 24 is being applied to the azimuthal columns of the display device 30, a pulse is applied to the row of diodes of the display 30 for the range that is queried by the range pulse applied to the range sequencer 28 to the memory matrix 22. Therefore, the diodes in the row of diodes in the display 30 to which an azimuthal pulse is applied and to which a range pulse is applied, light up to indicate that a target exists at the range and azimuth indicated by the lit up diode. Then the range sequencer 28 applies a query pulse to an adjacent row of memory elements in the matrix 22, thereby erasing the information in it. That which was stored in that row is transferred to the buffer memory 24 and in turn, read back into the memory matrix 22. The row of diodes in the display corresponding to this range has a pulse provided thereto and since the output of the buffer memory 24 is applied to all the columns of the diodes that have targets at that azimuth and at that distance, diodes at the intersection of that row and those columns that are energized are lit up, indicating targets at the corresponding distance and direction. Since all the columns and rows of the display 30 are scanned about 40 times a second, the diodes which correspond to the position of the target, by persistence of vision of the eye, appear to remain lit constantly and without flicker, even though the information is read into the memory 22 at a low rate of speed.

It has been pointed out that the antenna takes several seconds to complete a scan. Let it be assumed that a target appears on the display 30 to the right of the center line or zero position of the display 30 and that the vehicle on which the radar equipment is mounted turns towards the target. Then, until the next successive scan, the target would appear on the display as being to the right of straight ahead even though the vehicle will be moving directly toward it, and when the antenna is again pointed at the target, the display of the target would jump from its former position of right of straight ahead in the display 30 to a new position directly ahead on this display 30. That is, for several seconds, wrong azimuthal directions would be indicated and then the target would suddenly appear in a new position making tracking the target and recognizing the target at its new position difficult. Means are provided to avoid these difficulties by providing means to cause change of position of the target on the display as the vehicle turns which is independent of the position of the antenna in its scan.

A yaw rate gyro 32 is mounted on the vehicle 9 carrying the radar equipment. This gyro 32 provides an output voltage which is proportional to the rate of turn or yaw of the vehicle. The output thereof is applied to an integrator 34. The voltage output of the integrator 34 is a measure of the angle the vehicle has turned through from a reference line. The output of the integrator 34 is applied to a threshold device 36. There is no output of the threshold device 36 until the voltage output of the integrator 34 is great enough to indicate that the vehicle has turned through an angle equal to the difference in azimuth of two adjacent columns of memory elements in the memory matrix 22. Then, there will be a voltage output of the threshold device, this voltage output being applied to the integrator 34 to reset it to zero. The output 38 of the threshold device 36 is energized for turns to the right and the output 40 of the threshold device 36 is energized for turns to the left of the vehicle 9. The outputs 38 and 40 of the threshold device 36 are applied to the buffer memory 24 to shift the memory in the buffer 34 either to the right or to the left depending on whether the vehicle is turned to the left or to the right. Since the output of the buffer memory 24 is what is applied to the azimuth input terminals of the display device 30, the display is corrected for the turn of the vehicle 9. Since the output of the buffer memory 24 is applied to the memory matrix 22, the azimuthal contents of the memory matrix 24 are also corrected for the turn of the vehicle 9. If the turn is greater than the difference in azimuth of two adjacent columns of memory elements of the memory matrix 22, successive pulses at the outputs 38 and 40 will shift the memory in the buffer 24 to the left or right, the correct number of columns. Then, when the antenna again points to the target, the target memory and indication in azimuth will not be changed or if changed, will be changed but little. When the vehicle is not changing direction, the intermediate output 42 is applied to the buffer memory 24 to prevent shift in the memory thereof.

If the rate of pulses applied to the input terminal 26 is constant, the amount of time taken up to control each diode element of the display 30 is the same whether it is to be lit up or to be dark. The brightness of the display can be increased by spending less time to control diodes that are not to be lit up than on controlling diodes that are lit up. This is accomplished as follows:

When all the memory devices in a row thereof in the matrix memory 22 are queried and shifted to the buffer memory 24 and the output of all the memory elements of the buffer memory 24 are applied to an OR circuit 44, there will be no output thereof unless at least one target appears at that range distance. If there is no target at that range distance, the range sequencer can skip immediately to the next range distance since no diode need be lit up. Therefore, a clock pulse generator 46 which produces 8,000 cycles per second, for example, may be used to cause the range sequencer 28 to query the row of memory elements in the memory matrix 22 corresponding to such a range distance where there is no target in one eight thousandths of a second. However, if at a particular range distance, there is a target, there will be an output from the OR circuit 44 and the 8,000 pulses per second produced by the clock 46 will be divided in two by the frequency divider 48 to which the output of the clock 46 is applied, and twice as much time or one four thousandths of a second will be available to light up the diode or diodes of the display 30 that correspond to the position of a target.

The output of the clock pulse generator 46 is connected to the input of the divide-by-two frequency divider 48. The output of the clock 46 is also applied to one input of an AND circuit 50 to the other input of which the output of the OR circuit 44 is applied by means of an inverter 52. The output of the divider 48 is applied to one input of the AND 54, to the other input of which the output of the OR 44 is also applied. The outputs of the two ANDs 50 and 54 are applied to the inputs of an OR 56 and the output of the OR 56 is applied to the input 26 of the range sequencer 28. When there is no input to the OR 44, there are two inputs to the AND 50, whereby the 8,000 pulses per second produced by the clock 46 are applied to the input terminal 26 by way of the AND circuit 50 and the OR circuit 56, and the range sequencer 28 hurries to the next range distance in one eight thousandths of a second. If there is an output from the OR 44, that is, when there is a target at a certain range, only one input is applied to the AND 50 and two inputs are applied to the AND 54, whereby pulses from the divider 48 are applied to the terminal 26 by way of the AND 54 and the OR 56, whereby the range sequencer 28 stays at a certain range where there is at least one target for twice the time the range sequencer 28 stays at a range where there is no target and therefore, the diodes that light up and which are part of the display 30, stay lit a greater percentage of the time, that is, they have a greater duty cycle.

The display 30 is of truncated sectorial shape since the terrain scanned by the antenna is of truncated sectorial shape, Since the diode light sources of which the display device is made are all of the same size and of finite size, the devices can be crowded in side by side along the curved edge 58 to form a curved row indicating maximum range. However, for each successive curved row indicating lesser range, there is less room for the diodes. To keep the diodes within the azimuth boundaries 60 and 62, soon a diode will have to be omitted in a curved range row. This is indicated by the forked lines 64 and 66 on the face of the display 30. The dual upper parts of the forked lines 64 and 66 indicate two diodes side by side in the curved row. The single line part of the forked lines 64 and 66 indicate one diode in the curved row. If the diodes were very small, each column could be made of narrow truncated sectorial shape. However, with diodes of the size available, the described configuration must be used. Whenever one diode represents two columns, as the single portion of the forks 64 and 66, and the diode in either column would be lit up by the described apparatus, then the diode that represents the two columns is lit up.

If the switches 19 are moved to their dotted positions, no erase pulse is applied to the successive columns of the memory elements of the memory matrix 22. In such case, successive positions of a target would be stored in the memory matrix 22, transferred to the buffer memory 24, restored to the memory matrix 22 and applied to the display 30 to show the relative track of the target and the vehicle. That is, since no information will be erased from the memory matrix 22, all successive positions of the target with respect to the vehicle will be shown on the display 60.

If it is desired to study a display without any changes therein, the two switches 66 and 68 may be opened, in which case no changes are made in the information stored since no information is added thereto, whereby the memory matrix 22 continues to store and the display 30 continues to display the same indications unchanged.

What is claimed is:
1. Radar apparatus comprising
   a memory matrix,
   means to insert into said memory matrix information as to the angular direction and range to a target at predetermined rates,
   means to read out of said memory matrix the information at a higher rate,
   said readout being destructive of the information stored in said memory matrix, means for feeding back information from said readout means to said memory matrix to restore said information in said memory matrix, a solid state display device, and means to apply the information read out of said matrix to said solid state display to display therein the angular and range position of said target continuously and without flicker.

2. The invention of claim 1 in which a condition sensor is provided and in which means are provided to modify said information read out of said readout means in accordance with the conditions sensed by said condition sensor.

3. The invention of claim 2 in which said radar apparatus is mounted for orientation and in which said condition sensor senses changes in orientation of said radar apparatus and changes the information in said readout means in accordance with the change of orientation sensed by said change in orientation sensor.

4. Radar apparatus comprising means to provide information as to the range of targets in a field to be scanned, means to provide information as to the angle of direction to the targets in said field, a memory matrix having rows and columns of memory elements, means to store said range information in rows of said memory matrix, means to store said directional information in columns of said memory matrix, whereby each memory element has information stored therein as to whether a target appears at a respective direction and range from said radar apparatus, a buffer memory, means to shift the information in a row of said memory matrix to said buffer memory and to erase the information in said row of said memory matrix, a display device having rows and columns of indicators, means to apply information stored in said buffer memory to corresponding columns of indicators of said display device, means to apply the information stored in said buffer memory to said row from which the information has been erased to restore said information to said row of said memory matrix, and said information as to direction being stored in said matrix at a low rate of speed and said information being shifted to said buffer memory at a much higher rate of speed.

5. The invention of claim 4 in which said radar apparatus is mounted for change in direction with respect to said target, means are provided to sense changing direction of said apparatus with respect to a reference direction, and means are provided which are responsive to said direction change sensor for shifting the information in said buffer memory in one direction or in the opposite direction responsive to the change in direction of said radar apparatus.

6. The invention of claim 5 in which said change in direction sensor includes a rate of direction change gyro, an integrator coupled to said rate of change gyro, and a threshold device coupled to said integrator, the output of said threshold device being connected to shift the information in said buffer memory.

7. The invention of claim 6 in which the threshold device provides an output when the direction of said radar has been changed to an angle equal to the difference in angle indicated by adjacent columns of said memory matrix.

8. The invention of claim 4 in which means are provided to sense the presence of a target for all orientations and for a predetermined range from said radar apparatus, and in which means are provided to shift said directional information to said buffer memory at a higher rate when no target is sensed than when a target is sensed.

9. The invention of claim 8 in which a clock pulser is provided producing pulses at a predetermined high rate, means are provided to produce pulses at a lower rate, and means are provided to shift information from said memory matrix to said buffer memory at a rate of said clock pulser when no target is sensed by said target sensor and to shift information from said memory matrix to said buffer memory at the rate of said means to produce pulses when a target is sensed by said target sensor.

10. The invention of claim 9 in which said means to provide pulses is a frequency divider fed by said clock pulser.

11. The invention of claim 10 in which the output of said clock pulser and of said frequency divider are fed to respective AND circuits and the output of the sensor is fed directly to one AND circuit and through an inverter to said other AND circuit, the output of both of said AND circuits being applied to cause feeding of information from said memory matrix to said buffer memory.

* * * * *